US009277007B2

(12) United States Patent
Nam et al.

(10) Patent No.: US 9,277,007 B2
(45) Date of Patent: Mar. 1, 2016

(54) APPARATUS AND METHOD FOR RECONFIGURING PEER-TO-PEER CONNECTION BETWEEN TERMINALS (75) Inventors: Sang-Su Nam, Seoul (KR); Seong-Ho Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 701 days.

(21) Appl. No.: 13/495,685

(22) Filed: Jun. 13, 2012

(65) Prior Publication Data
US 2012/0317199 A1    Dec. 13, 2012

(30) Foreign Application Priority Data
Jun. 13, 2011    (KR) ........................ 10-2011-0056803

(51) Int. Cl.
G06F 15/16    (2006.01)
H04L 29/08    (2006.01)
H04W 84/20    (2009.01)
H04L 29/06    (2006.01)
H04W 76/02    (2009.01)

(52) U.S. Cl.
CPC ........... *H04L 67/1044* (2013.01); *H04W 84/20* (2013.01); *H04L 69/24* (2013.01); *H04W 76/023* (2013.01)

(58) Field of Classification Search
CPC ... H04W 76/00; H04W 76/02; H04W 76/023; H04W 84/20; H04W 69/24
USPC ........... 709/204–205, 227–228; 370/328, 338
See application file for complete search history.

(56) References Cited

U.S. PATENT DOCUMENTS

| 8,307,100 | B2 * | 11/2012 | Tanimoto | H04L 63/083 709/229 |
| 8,848,677 | B2 * | 9/2014 | Choi | H04W 76/023 370/338 |
| 2004/0148406 | A1 * | 7/2004 | Shima | H04L 29/06 709/204 |
| 2011/0082939 | A1 * | 4/2011 | Montemurro et al. | 709/227 |
| 2011/0082940 | A1 * | 4/2011 | Montemurro | H04W 76/023 709/227 |
| 2015/0009981 | A1 * | 1/2015 | Choi | H04W 76/023 370/338 |

\* cited by examiner

*Primary Examiner* — Bharat N Barot
(74) *Attorney, Agent, or Firm* — The Farrell Law Firm, P.C.

(57) ABSTRACT

A method and apparatus for a Peer-to-Peer (P2P) connection between terminals are provided. The method of a group owner terminal that establishes the P2P connection between terminals includes determining a terminal to be operated as a next owner terminal among terminals included in a group connected via the P2P connection, and transmitting information about general member terminals included in the group to the next owner terminal.

20 Claims, 12 Drawing Sheets

APPARATUS AND METHOD FOR RECONFIGURING PEER-TO-PEER CONNECTION BETWEEN TERMINALS

PRIORITY

This application claims priority under 35 U.S.C. §119(a) to Korean Ser. No. 2011-0056803, which was filed in the Korean Intellectual Property Office on Jun. 13, 2011, the entire disclosure of which is hereby incorporated by reference.

BACKGROUND OF THE INVENTION

1. Field of the Invention

The present invention relates generally to a peer-to-peer connection between terminals, and more particularly, to a method and apparatus for reconfiguring a group of terminals that perform communication through the peer-to-peer connection.

2. Description of the Related Art

An infrastructure mode and an ad-hoc mode are defined in a Wireless Local Area Network (WLAN) defined in the Institute of Electrical and Electronics Engineers (IEEE) 802.11 standard. In the ad-hoc mode, a plurality of 802.11 radio stations perform direct communication without having to use an access point or other wired network connection. Accordingly, and the ad-hoc mode is a type of a Peer-to-Peer (P2P) mode. The ad-hoc mode is useful because a wireless network can be promptly and easily configured in an environment where a wireless infrastructure does not exist. However, the ad-hoc mode has problems in that a supported data rate is limited to 11 Mbps, security is limited, and power saving is difficult.

A P2P mode, i.e., a direct mode, including a group owner terminal and a general member terminal has recently been proposed. In the direct mode, a terminal that desires to perform a P2P operation first performs a P2P discovery procedure to search for at least one neighboring P2P terminal and then establishes a P2P network by performing a P2P group owner negotiation procedure and a channel negotiation procedure with respect to the at least one found neighboring P2P terminal. Therefore, a plurality of P2P terminals can communicate with each other by using a terminal determined as a group owner.

However, when a plurality of P2P terminals communicate with each other by establishing a P2P network using a terminal determined as the group owner, as described above, if the group owner terminal is disassociated, e.g., due to movement or a power off, a procedure of re-negotiating the group owner has to be performed among the remaining general member terminals. Accordingly, it is inconvenient and time-consuming to re-establish the P2P network among the remaining general member terminals.

SUMMARY OF THE INVENTION

The present invention is designed to solve at least the above-described problems and/or disadvantages and to provide at least the advantages described below.

Accordingly, an aspect of the present invention is to provide a method and apparatus for reconfiguring a group of terminals that perform communication through a P2P connection in a WLAN.

Another aspect of the present invention is to provide a method and apparatus for determining a next owner of a group by a terminal determined as a group owner when a P2P connection is established in a WLAN.

Another aspect of the present invention is to provide a method and apparatus for re-associating general member terminals by a next owner terminal of a group when a terminal determined as a group owner is disassociated from the group that performs communication in a P2P mode through a WLAN.

In accordance with an aspect of the present invention, a method of a group owner terminal that establishes a P2P connection between terminals is provided. The method includes determining a terminal to be operated as a next owner terminal among terminals included in a group connected via the P2P connection, and transmitting information about general member terminals included in the group to the next owner terminal.

In accordance with another aspect of the present invention, a method of a member terminal that establishes a P2P connection between terminals is provided. The method includes receiving, from a group owner terminal of a group connected via the P2P connection, a message indicating that the member terminal will operate as a next owner terminal, receiving and storing information about general member terminals included in the group from the group owner terminal, and monitoring the group owner terminal.

In accordance with another aspect of the present invention, an apparatus of a group owner terminal that establishes a P2P connection between terminals is provided. The apparatus includes a controller for determining a terminal to be operated as a next owner terminal among terminals included in a group connected via the P2P connection, and a communication module for transmitting information about general member terminals included in the group to the next owner terminal.

In accordance with another aspect of the present invention, an apparatus of a member terminal that establishes a P2P connection between terminals is provided. The apparatus includes a communication module for receiving, from a group owner terminal of a group connected via the P2P connection, a message indicating that the member terminal will operate as a next owner terminal and receiving information about general member terminals included in the group from the group owner terminal, a storage unit for storing the information about the general member terminals included in the group, and a controller for detecting a disassociation of the group owner terminal.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will be described in detail herein below with reference to the accompanying drawings. In the following description, well-known functions or constructions are not described in detail to avoid obscuring the invention in unnecessary detail. Also, the terms used herein are defined according to the functions of the present invention. Thus, the terms may vary depending on a user's or operator's intension and usage. That is, the terms used herein must be understood based on the descriptions made herein.

In accordance with an embodiment of the present invention, a method and apparatus are provided for reconfiguring a group of terminals that perform communication through a P2P connection in a WLAN. The terminal includes electronic devices capable of communication through a wireless local area technique, e.g., a cell phone, a desktop computer, a laptop computer, a tablet Personal Computer (PC), a TeleVision (TV) set, a printer, a digital camera, etc.

In accordance with an embodiment of the present invention, when a plurality of terminals establish a P2P network in a WLAN, a next owner terminal of a group is determined in preparation for a group owner terminal leaving the group. Herein, "group owner terminal" refers to a terminal that operates as an Access Point (AP) for P2P communication among a plurality of terminals in a group. And the group owner terminal is determined by performing a negotiation procedure between the terminals when the P2P connection is established.

In addition, in accordance with an embodiment of the present invention, the terminal determined as the next owner terminal of the group receives and stores information of general terminals included in the group from the group owner terminal. Accordingly, if the P2P connection of the group owner terminal is released, a procedure of re-negotiating a group owner terminal of the group may be omitted, and the next owner terminal may operate as the group owner terminal so that the P2P connection is promptly re-established to the general terminals based on the pre-stored information about the general terminals included in the group.

Figure 1:
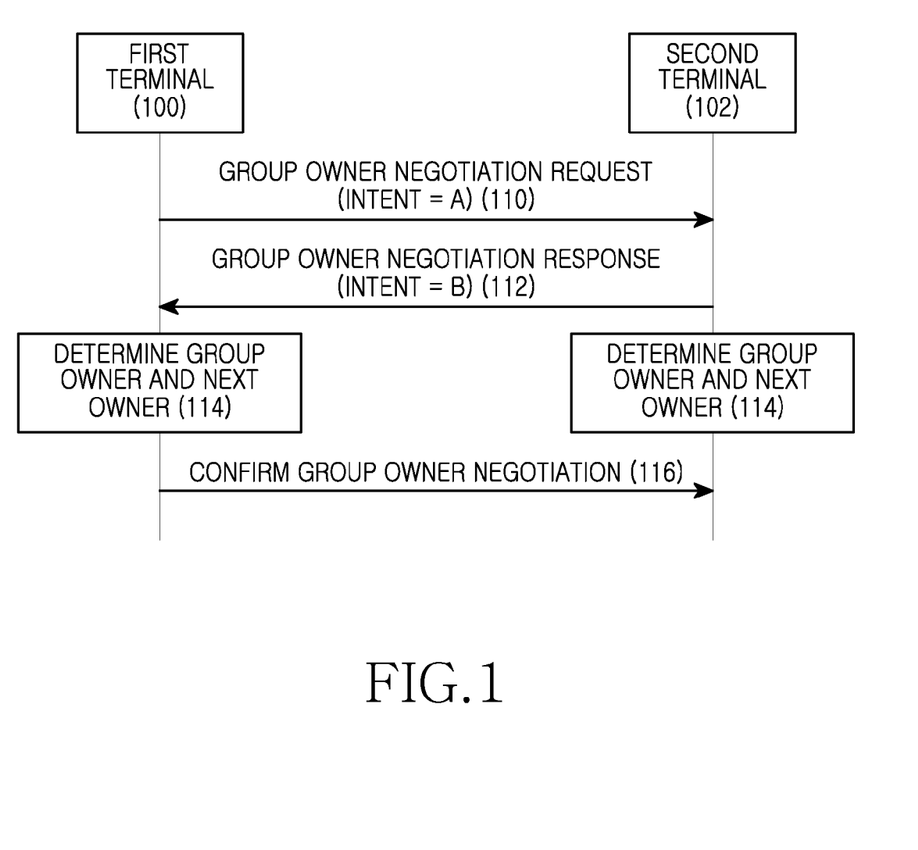
FIG. 1 is a signal flow diagram illustrating a process of determining a group owner or a next owner between terminals included in a group that performs communication in a P2P mode according to an embodiment of the present invention.
Figure 2:
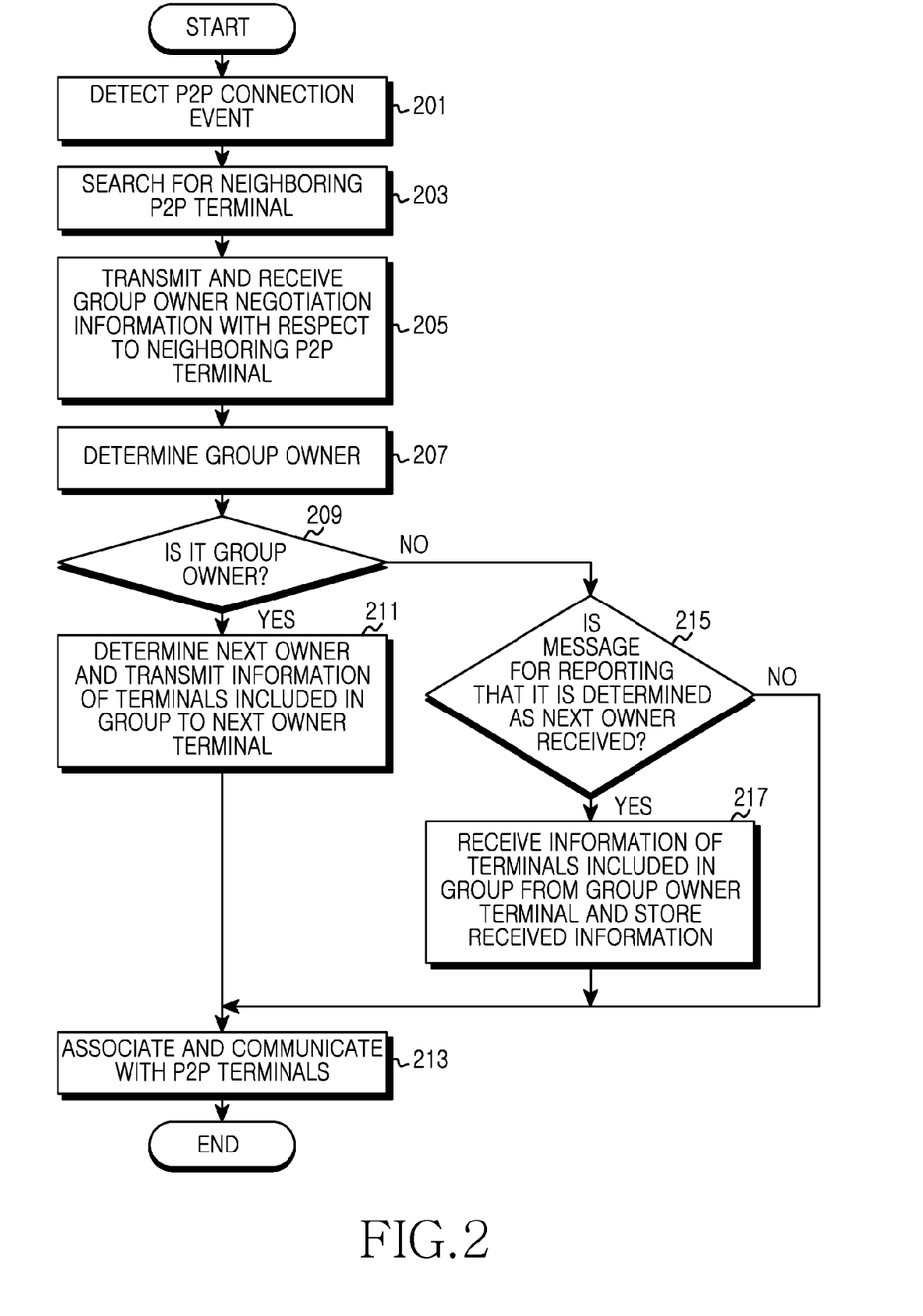
FIG. 2 is a flowchart illustrating a P2P connection process in a terminal according to an embodiment of the present invention.

FIG. 1 is a signal flow diagram illustrating a process of determining a group owner terminal or a next owner terminal between terminals included in a group that performs communication in a P2P mode according to an embodiment of the present invention. Although FIG. 2 illustrates a group owner negotiation procedure for a P2P connection between a first terminal 100 and a second terminal 102, the following description is equally applicable to a P2P connection established between a more than two terminals.

Referring to FIG. 1, in step 110, in order to establish the P2P connection, the first terminal 100 transmits a message requesting group owner negotiation to the second terminal 102, which is found by performing scanning. The message requesting the group owner negotiation includes an intent value that indicates an intention of the first terminal 100 to become an owner of a terminal group. Herein, the greater the intent value, the higher the intention of the terminal to become the group owner terminal. The intent value of each terminal can be determined in a design process, and can be determined and modified by a user.

In step 112, the second terminal 102 transmits a message responding to the group owner negotiation to the first terminal 100. The message responding to the group owner negotiation includes an intent value that indicates an intention of the second terminal 102 to become the group owner.

In step 114, the first terminal 100 and the second terminal 102 compare the intent values of the respective terminals and determine a next owner terminal and a group owner terminal of the P2P group. More specifically, the first terminal 100 and the second terminal 102 compare the intent values and determine a terminal having the highest intention to become the group owner as the group owner terminal of the P2P group, and determine a terminal having the second highest intention to become the group owner terminal as a next owner terminal of the P2P group.

For example, if the intent value of the first terminal 100 is 12 and the intent value of the second terminal 102 is 11, the first terminal 100 is determined as the group owner terminal, and the second terminal 102 is determined as the next owner terminal. If a new terminal joins the P2P group, the next owner terminal can change according to an intent value of the new terminal, which will be described below in greater detail.

When the group owner terminal and the next owner terminal are determined as described above, in step 116, the first terminal 100 transmits a message indicating that the group owner negotiation is confirmed to the second terminal 102. For example, the message indicating that the group owner negotiation is confirmed may include information on the group owner terminal and the next owner terminal.

While FIG. 1 illustrates the group owner terminal and the next owner terminal being simultaneously determined based on the intent value exchanged between the respective terminals included in the group owner negotiation process, it is also possible to determine the group owner terminal through the group owner negotiation process and then to determine the next owner terminal by the group owner terminal, after completion of the P2P connection process. That is, the time at which the group owner terminal determines the next owner terminal can be modified without departing from the spirit of the present invention.

FIG. 2 is a flowchart illustrating a P2P connection process in a terminal according to an embodiment of the present invention.

Referring to FIG. 2, the terminal detects a P2P connection event in step 201, and searches for a neighboring P2P terminal by performing scanning in step 203. In step 205, the terminal transmits and receives information for group owner negotiation with respect to the found neighboring P2P terminal. As described above, the information for the group owner negotiation may include terminal identifier information and an intent value that indicates an intention to become a group owner terminal.

In step 207, the terminal determines the group owner by comparing group owner negotiation information received from the neighboring terminal with the terminal's own group owner negotiation information. That is, by comparing intent values of the respective terminals that establish the P2P connection, a terminal having the highest intention to become the group owner terminal is determined as the group owner terminal.

In step 209, the terminal determines whether it has been determined as the group owner terminal. If the terminal is the group owner terminal, in step 211, the terminal determines a next owner terminal of the P2P group and transmits information of other terminals included in the group to the terminal determined as the next order. Of course, the group owner terminal and the next owner terminal associate all terminals that will establish the P2P connection, such that the terminals can determine the group owner terminal and the next owner terminal by comparing the intent values of the terminals capable of associating all of the terminals that will establish the P2P connection.

If the terminal is not determined as the group owner terminal, the terminal determines whether a message reporting that the terminal is determined as the next owner terminal is received from the group owner terminal in step 215.

Upon receiving the message reporting that the terminal is determined as the next owner terminal from the group owner, the terminal receives and stores information about the terminals included in the group from the group owner terminal in step 217. As described above, the information about the terminals included in the group may be included in the message reporting that the terminal is determined as the next owner terminal or may be received separately.

If the message reporting that the terminal is determined as the next owner terminal is not received from the group owner terminal, the terminal recognizes that the terminal is a general member of the group.

In step 213, the terminal configures a P2P network by associating with the terminals that intend to establish the P2P connection, and communicates through the configured P2P network.

Figure 3A:
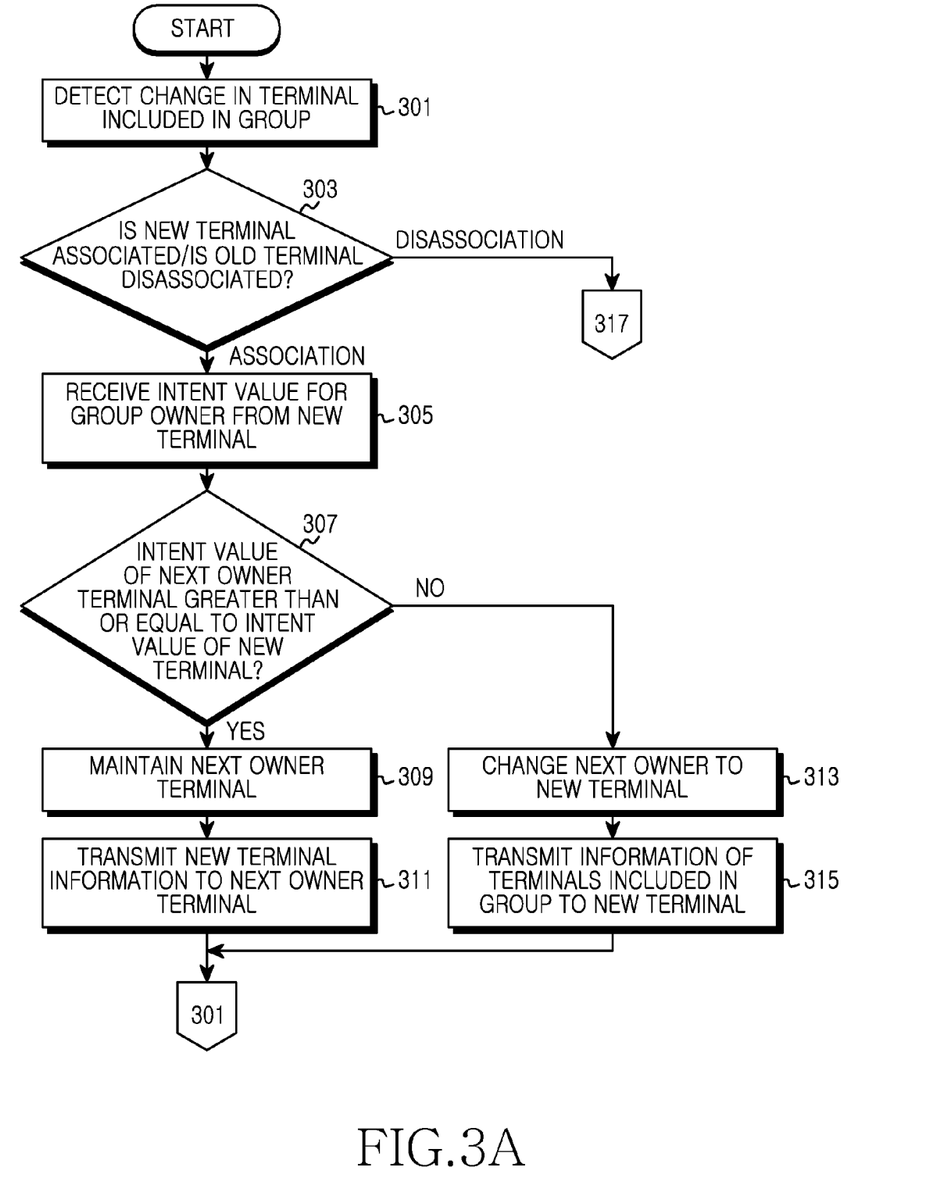
FIG. 3A and FIG. 3B are flowcharts illustrating a process of a terminal determined as a group owner terminal in a P2P mode according to an embodiment of the present invention.
Figure 3B:
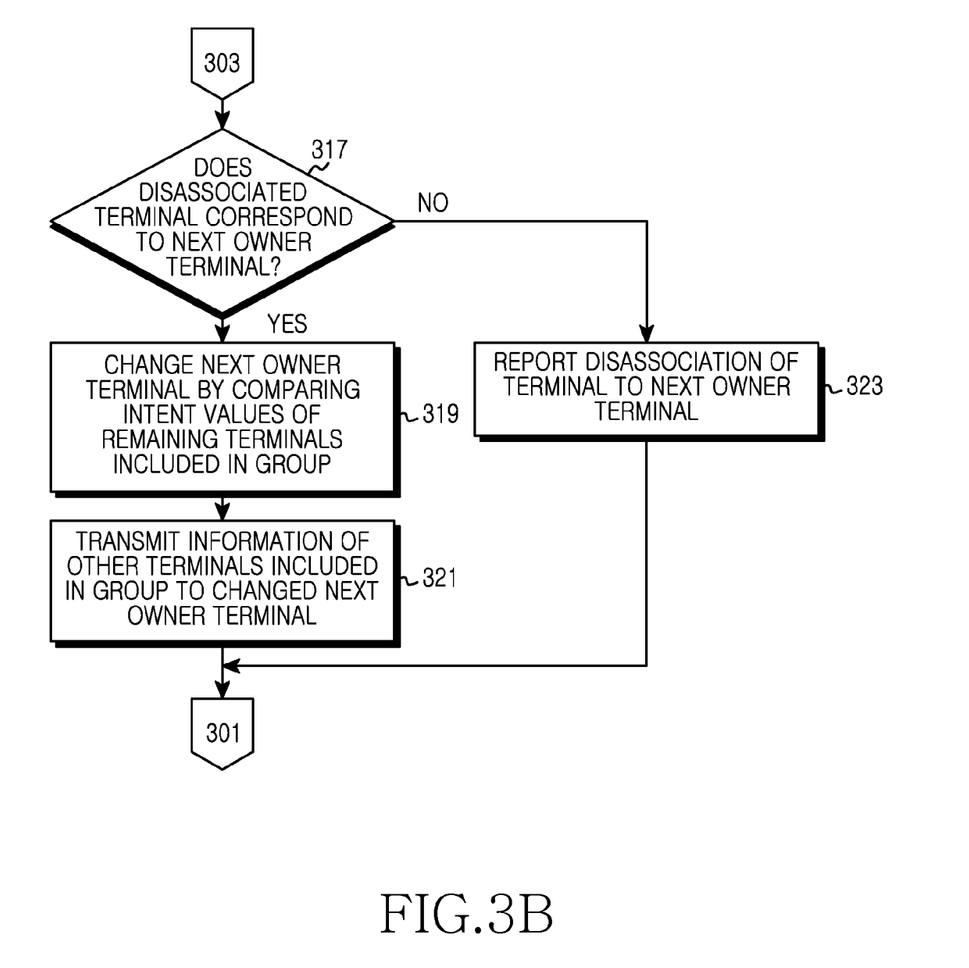

FIGS. 3A and 3B are flowcharts illustrating a process of a terminal determined as a group owner terminal in a P2P mode according to an embodiment of the present invention.

Referring to FIG. 3A, the group owner terminal detects a change event of a terminal included a group in step 301. For example, the group owner terminal detects the occurrence of an event for deleting information about the terminal belonging to the group, when the terminal included in the group releases (or ends) a P2P connection, or detects the occurrence of an event for adding information of the terminal included in the group by detecting a new terminal attempting to establish a P2P connection.

In step 303, the group owner terminal determines whether the detected change event of the terminal included in the group is an event for associating a new terminal or an event for disassociating an old terminal.

If the detected event is the event for associating the new terminal, the group owner terminal receives and stores an intent value that indicates an intention to become the group owner terminal from the new terminal in step 305.

Figure 6A:
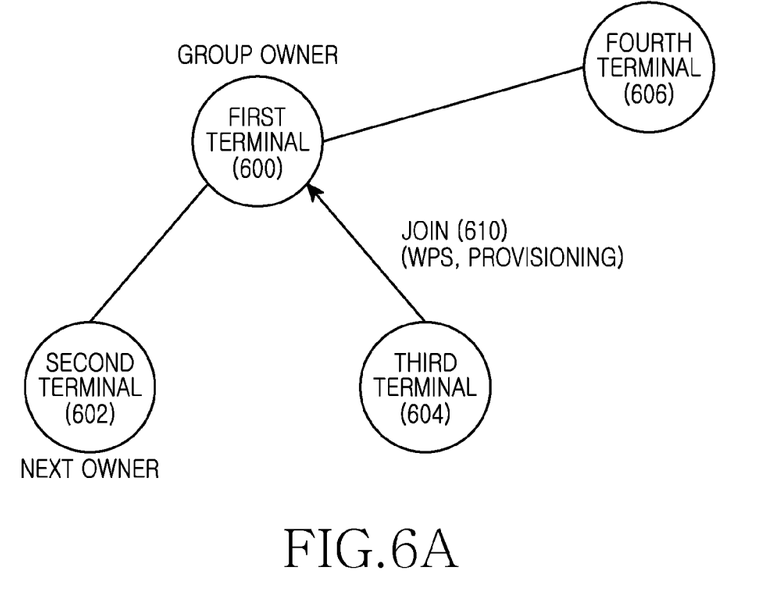
FIG. 6A to FIG. 6C illustrate a terminal being added to a group in a P2P mode according to an embodiment of the present invention.

For example, as illustrated in FIG. 6A, when a first terminal 600, a second terminal 602, and a fourth terminal 606 perform P2P group communication and the first terminal 600 is a group owner terminal and the second terminal 602 is a next owner terminal, if a third terminal 604 requests a P2P connection in step 610, then the third terminal 604 transmits an intent value that indicates an intention to become a group owner terminal to the first terminal 600. The first terminal 600 stores the intent value of the third terminal 604.

In step 307, the group owner terminal compares an intent value of a terminal determined as a next owner terminal of the group with an intent value of the new terminal to determine whether the intent value of the next owner terminal is greater than or equal to the intent value of the new terminal. Herein, the group owner terminal pre-stores intent values of all terminals included in the group, i.e., the intent values of the next owner terminal and the general member terminals.

If the intent value of the next owner terminal is greater than or equal to the intent value of the new terminal, the group owner terminal maintains the next owner terminal in step 309, and transmits information of the new terminal to the next owner terminal in step 311.

Figure 6B:
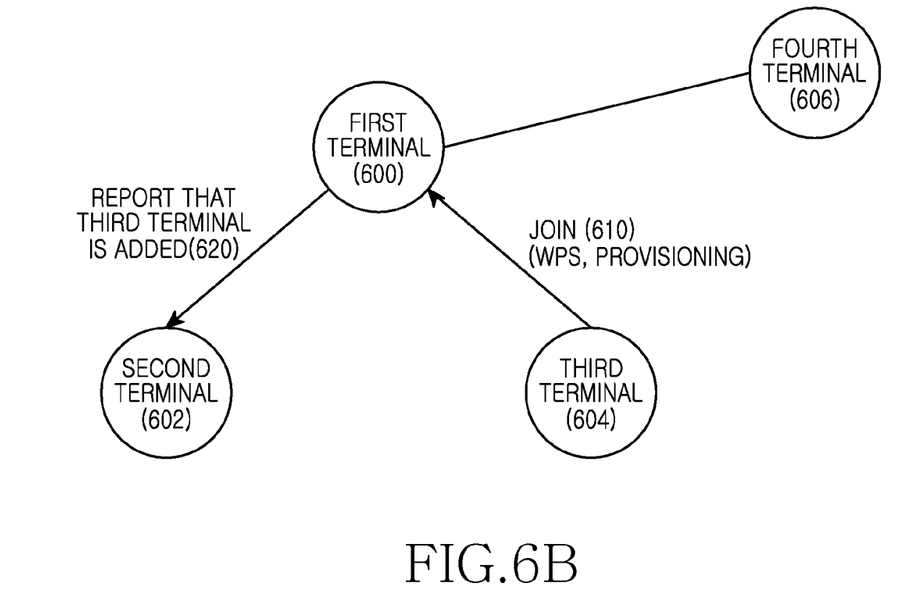

For example, as illustrated in FIG. 6B, when a first terminal 600, a second terminal 602, and a fourth terminal 606 perform P2P group communication, where the first terminal 600 is a group owner terminal and the second terminal 602 is a next owner terminal, the third terminal 604 requests a P2P connection in step 610. Herein, it is assumed that an intent value of the second terminal 602, which is the next owner terminal, is greater than or equal to an intent value transmitted by a third terminal 604. Therefore, the first terminal 600 maintains the second terminal 602 as the next owner, and reports to the second terminal 602 that the third terminal 604 is added in step 620, transmitting the intent value of the third terminal 604.

When the intent value of the next owner terminal is less than the intent value of the new terminal in step 307, the group owner terminal changes the next owner to the new terminal in step 313, and transmits information about the terminals included in the group to the new terminal in step 315.

Although not shown, the group owner terminal can transmit a signal indicating that the next owner terminal is changed to another terminal to the previous next owner terminal.

Figure 6C:
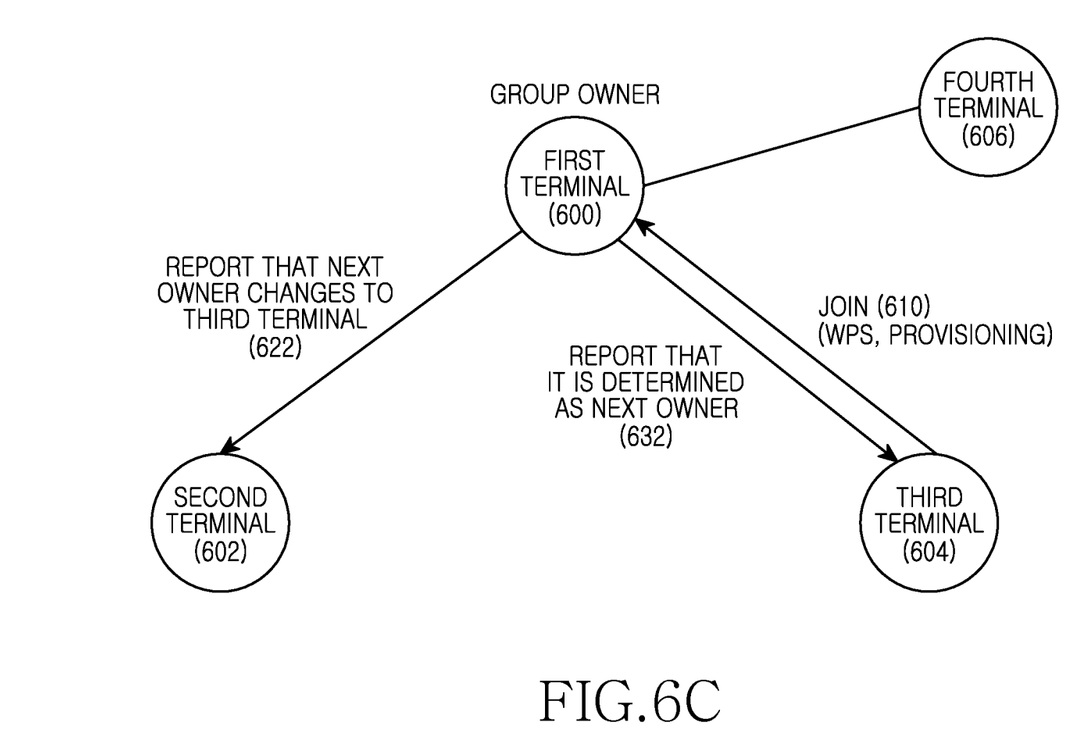

For example, as illustrated in FIG. 6C, where a first terminal 600, a second terminal 602, and a fourth terminal 606 perform P2P group communication, where the first terminal 600 is a group owner terminal and the second terminal 602 is a next owner terminal, a third terminal 604 requests a P2P connection in step 610. Herein, it is assumed that an intent value of the second terminal 602 is less than an intent value transmitted by the third terminal 604. Therefore, the first terminal 600 changes the next owner terminal from the second terminal 620 to the third terminal 604, reports to the third terminal 604 that it is determined as the next owner terminal in step 632, and transmits intent values of the second and fourth terminals 602 and 606 which are general terminals included in the group. Because the next owner terminal changes to the third terminal 604, the first terminal 600 transmits a signal instructing the second terminal 602 to operate as a general terminal in step 622.

Referring to FIG. 3B, when the detected event is for disassociating the old terminal, the group owner terminal determines whether the disassociated terminal is the next owner terminal in step 317.

If the disassociated terminal is the next owner terminal, the group owner terminal re-determines the next owner terminal by comparing intent values of general member terminals remaining in the group in step 319, and transmits information of other general members to the determined next owner terminal in step 321.

Figure 7A:
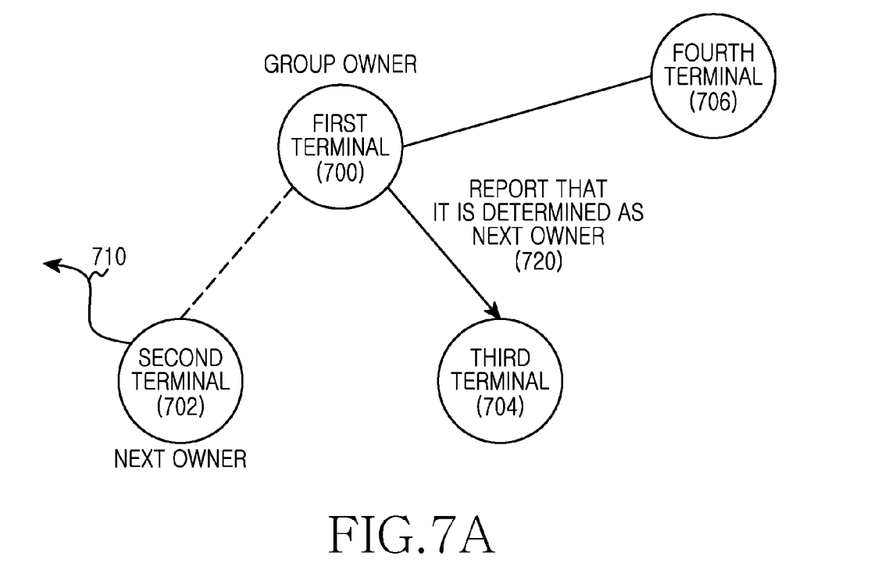
FIG. 7A and FIG. 7B illustrate a terminal being disassociated from a group in a P2P mode according to an embodiment of the present invention.

For example, as illustrated in FIG. 7A, where a first terminal 700, a second terminal 702, a third terminal 704, and a fourth terminal 706 perform P2P group communication, and the first terminal 700 is a group owner terminal and the second terminal 702 is a next owner terminal, if the second terminal 702 is disassociated in step 710, the first terminal 700 compares intent values of the third terminal 704 and the fourth terminal 706. Herein, it is assumed that the intent value of the third terminal 704 is greater than the intent value of the third terminal 706. Therefore, the first terminal 700 re-determines the third terminal 704 as the next owner terminal, reports to the third terminal 704 that it is determined as the next owner in step 720, and transmits the intent value of the fourth terminal 706.

However, when the disassociated terminal is a general member terminal in step 317, the group owner terminal transmits a message for reporting disassociation of the general member terminal to the next owner terminal in step 323.

Figure 7B:
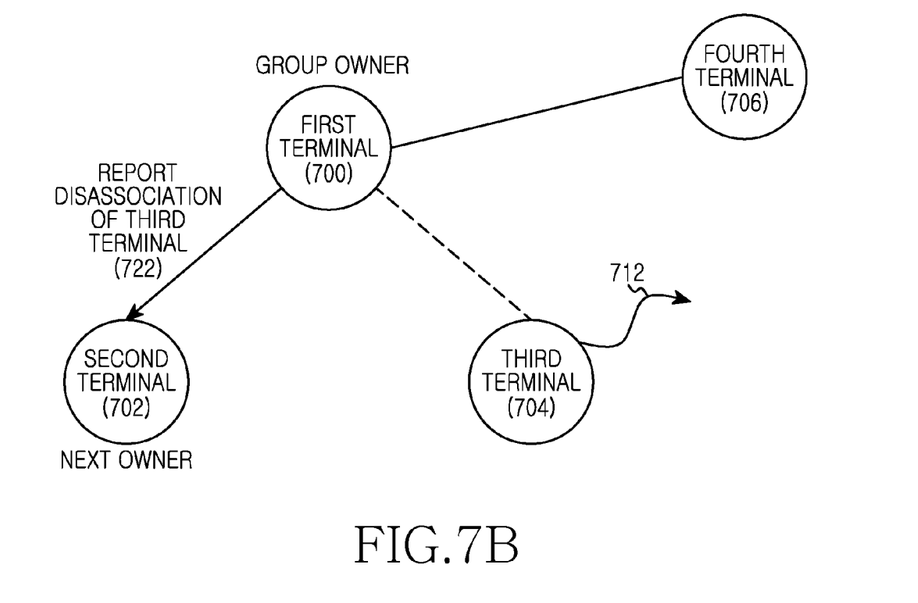

For example, as illustrated in FIG. 7B, where a first terminal 700, a second terminal 702, a third terminal 704, and a fourth terminal 706 perform P2P group communication, and the first terminal 700 is a group owner terminal and a second terminal 702 is a next owner terminal, if the third terminal 704, which is a general member, is disassociated in step 712, then the first terminal 700 reports the disassociation of the third terminal 704 to the second terminal 702 in step 722), allowing the second terminal 702 to delete information of the third terminal 704.

While FIGS. 3A and 3B illustrate that group owner terminal determines whether to maintain or change the next owner terminal, when a new terminal is added to the group, alternatively, the group owner terminal may simply store intent value of the new terminal without having to determine whether to maintain or change the next owner terminal. In this case, the intent value of the new terminal is merely stored so that intent values of terminals can be compared to determine the next owner terminal among the remaining terminals, when the next owner terminal is disassociated from the group.

In addition, it has been described above that, when information about terminals included in the group is added or deleted, a group owner terminal reports the added or deleted information to the next owner terminal. However, the group owner terminal may also transmit information about all of the terminals included in the group according to a design method. Further, irrespective of changes in the information of the terminals included in the group, the group owner terminal may periodically transmit the information about the terminals included in the group to the next owner terminal.

Figure 4:
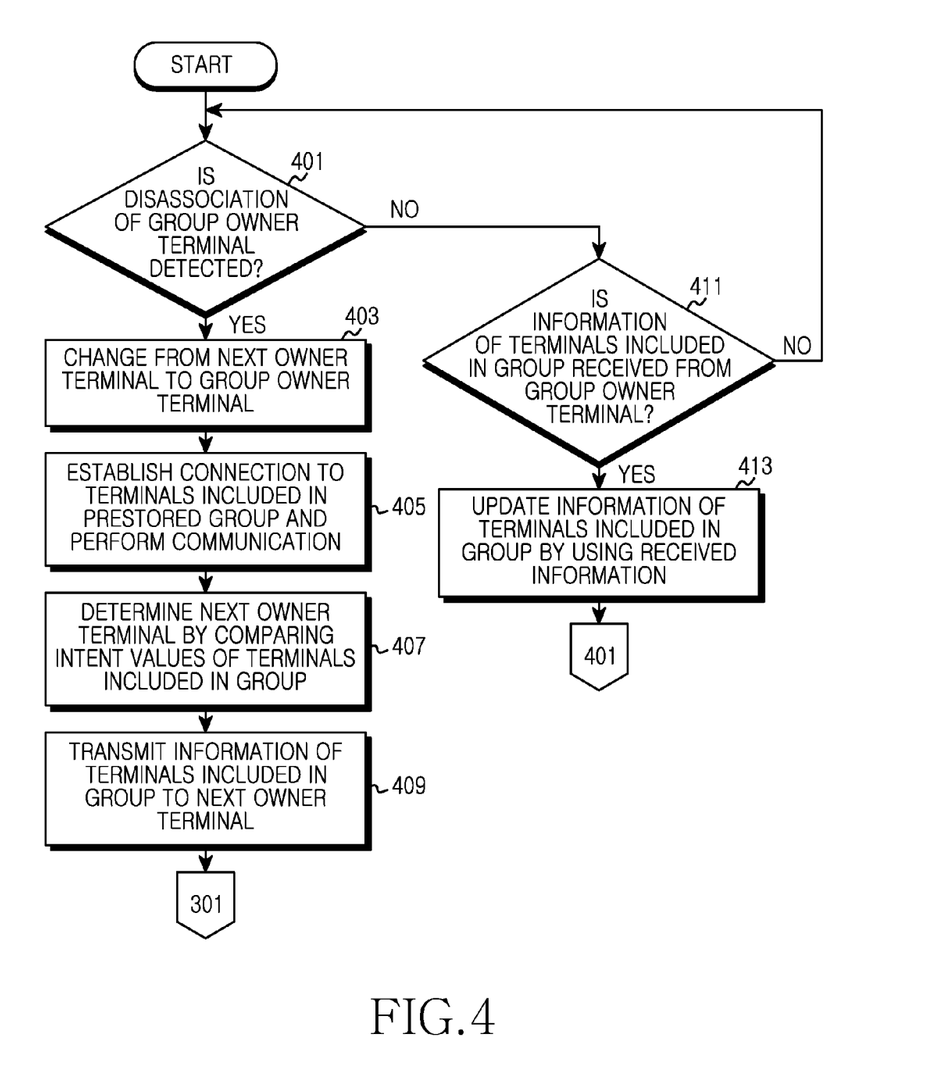
FIG. 4 is a flowchart illustrating a process of a terminal determined as a next owner terminal in a P2P mode according to an embodiment of the present invention.

FIG. 4 is a flowchart illustrating a process of a terminal determined as a next owner terminal in a P2P mode according to an embodiment of the present invention.

Referring to FIG. 4, the next owner terminal determines whether a group owner terminal is disassociated in step 401. For example, when the group owner terminal is disassociated normally, the next owner terminal can detect the disassociation of the group owner terminal by receiving a disassociation signal from the group owner terminal. Otherwise, when the group owner terminal is disassociated abnormally, e.g., due to a power off or movement away from the group, the disassociation of the group owner terminal can be detected according to whether a beacon signal is received from the group owner terminal or whether a signal is received in response to a communication signal.

Upon detecting the disassociation of the group owner terminal, the next owner terminal changes from a next owner terminal to a group owner terminal in step 403, and performs communication by establishing a P2P connection to terminals included in a pre-stored group in step 405. Thereafter, the terminal changed to the group owner determines the next owner terminal by comparing intent values of general member terminals included in the group in step 407, and transmits information about the other general member terminals included in the group to the next owner terminal in step 409. Thereafter, the method returns to step 301 of FIG. 3A.

Figure 8A:
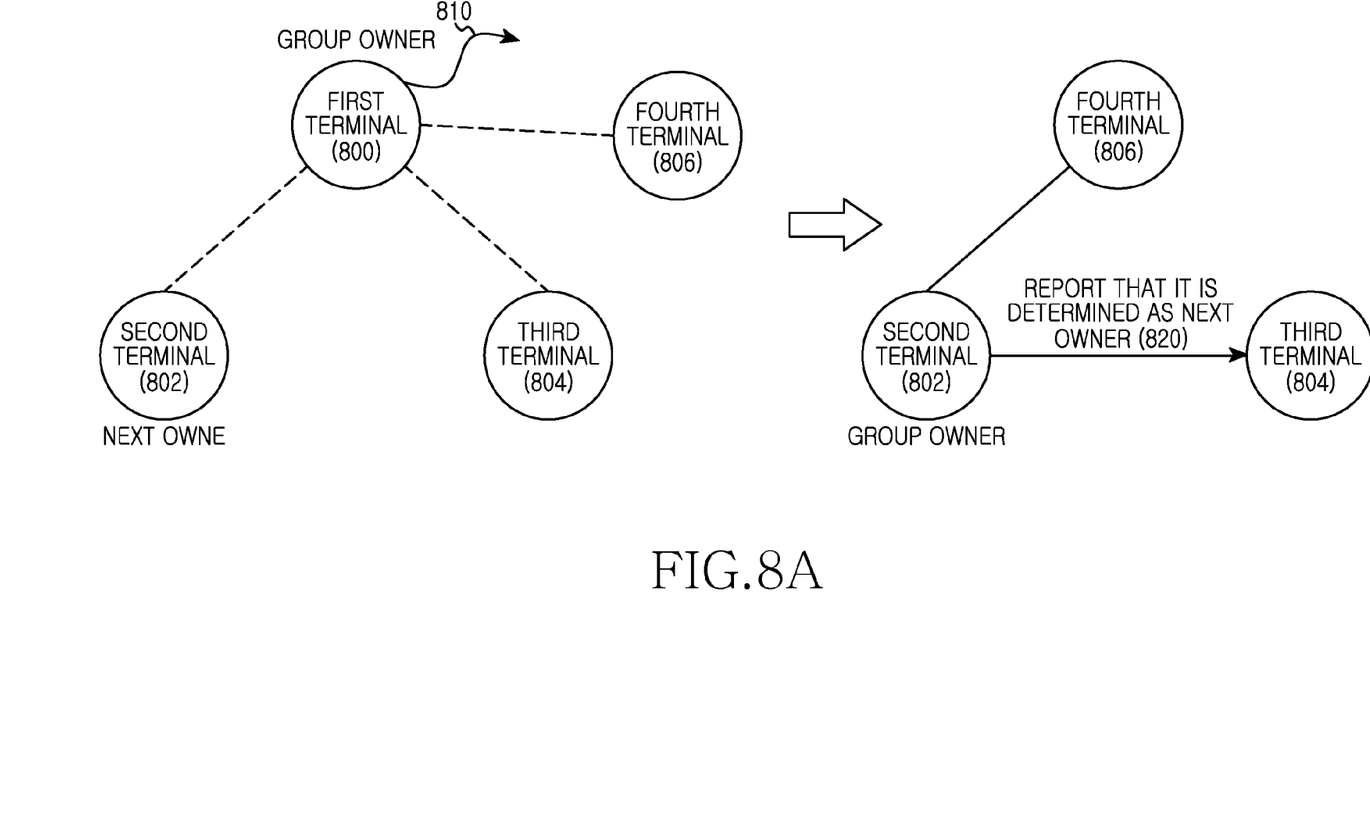
FIG. 8A and FIG. 8B illustrate a group owner terminal being disassociated from a group in a P2P mode according to an embodiment of the present invention.
Figure 8B:
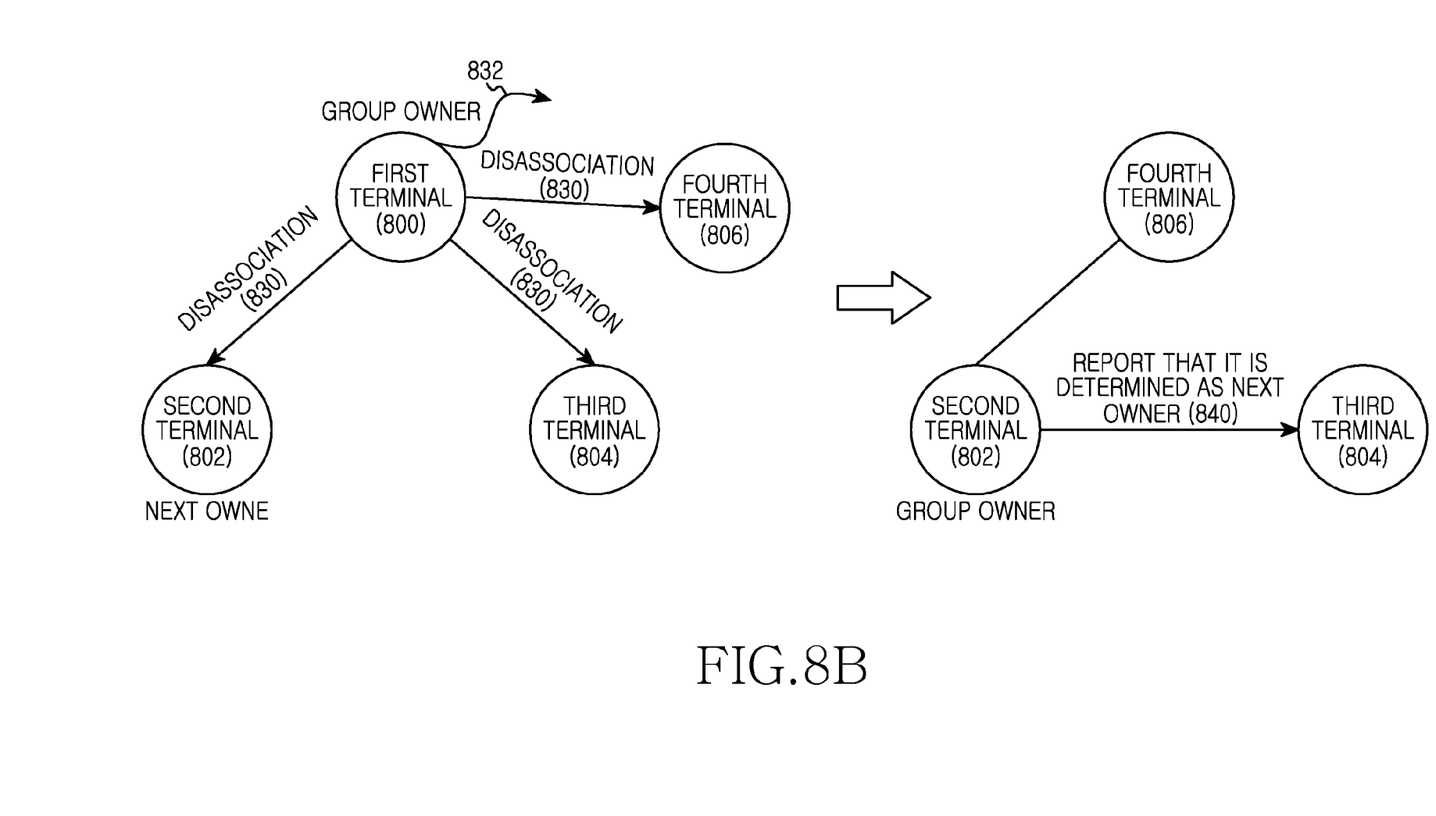

For example, as illustrated in FIG. 8A, where a first terminal 800, which is a group owner, is disassociated abnormally in step 810, or as illustrated in FIG. 8B, where a group owner normally transmits a disassociation signal to terminals 802, 804, and 806 included in a group in step 830, the second terminal 802, which is a next owner terminal, operates as the group owner, and establishes a P2P connection to a third terminal 804 and a fourth terminal 806. Thereafter, the second terminal 802 determines the third terminal 804 having a greater intent value between the third terminal 804 and the fourth terminal 806 as the next owner terminal, and transmits a signal for reporting that the third terminal 804 is determined as the next owner terminal to the third terminal 804 in steps 820 and 840, transmitting information about the fourth terminal 806.

When the owner terminal is disassociated normally, a disassociation frame is transmitted to each terminal by including information on the next owner terminal, so that terminals included in the group can re-configure a group more promptly with respect to the next owner terminal.

However, when the disassociation of the group owner terminal is not detected in step 401, the next owner terminal determines whether information about the terminals included in the group is received from the group owner terminal in step 411. If the information about the terminals included in the group is not received, the process returns to step 401.

However, upon receiving the information of the terminals included in the group in step 411, the next owner terminal updates the information about the terminals included in the group by using the received information in step 413. Thereafter, the process returns to step 401.

For example, upon receiving information reporting association of a new terminal from the group owner terminal, an intent value of the new terminal may be additionally stored in the terminal included in the group, and upon receiving information reporting disassociation of the old terminal from the group owner terminal, an intent value of the disassociated terminal may be deleted in the terminal included in the group.

Figure 5:
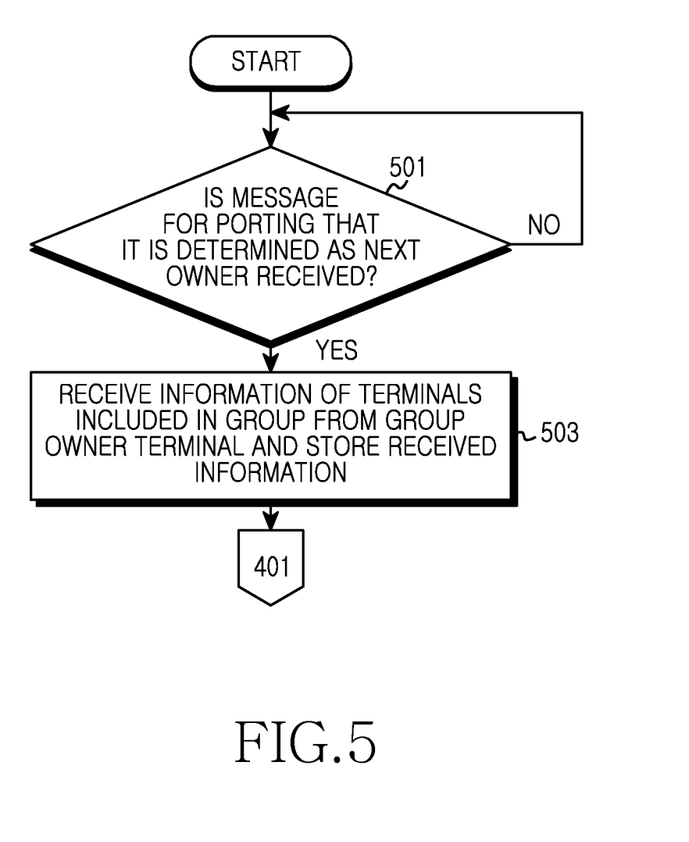
FIG. 5 is a flowchart illustrating a process of a terminal that operates as a general member terminal in a P2P mode according to an embodiment of the present invention.

FIG. 5 is a flowchart illustrating a process of a terminal that operates as a general member in a P2P mode according to an embodiment of the present invention.

Referring to FIG. 5, the general member terminal determines whether a message reporting that the terminal is determined as a next owner terminal is received in step 501. If the message reporting that the terminal is determined as the next owner terminal is not received, the procedure returns to step 501. However, if the message is received, the general member terminal changes to the next owner terminal, receives information about general member terminals included in a group from the group owner terminal, and stores the received information in step 503. Thereafter, procedure returns to step 401.

Figure 9:
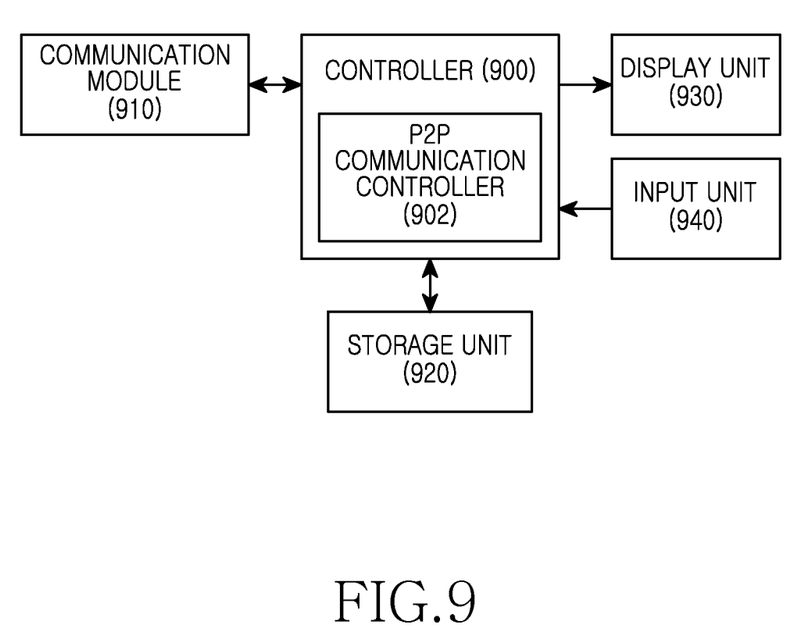
FIG. 9 is a block diagram illustrating a terminal according to an embodiment of the present invention.

FIG. 9 is a block diagram illustrating a terminal according to an embodiment of the present invention.

Referring to FIG. 9, the terminal includes a controller 900, a communication module 910, a storage unit 920, a display unit 930, and an input unit 940. In particular, the controller 900 includes a P2P communication controller 902.

The controller 900 controls and processes an overall operation of the terminal. In particular, by including the P2P communication controller 902, the controller 900 controls and processes a function for negotiating a group owner by transmitting and receiving an intent value that indicates an intention to become the group owner terminal with respect to the terminals that intend to perform P2P communication.

When the terminal is determined as the group owner terminal, the P2P communication controller 902 controls and processes a function for determining a next owner terminal based on intent values of terminals included in a group that perform the P2P communication and for transmitting information of other terminals included in the group to the terminal determined as the next owner terminal. In addition, the P2P communication controller 902 controls and processes a function for maintaining or changing the next owner terminal according to an association of a new terminal or a disassociation of an old terminal, or for transmitting information on the terminal changed to the next owner terminal.

Further, if the terminal is the next owner terminal, the P2P communication controller 902 stores information on general terminals included in the group into the storage unit 920, and detects a disassociation of the group owner terminal. Upon detecting the disassociation of the group owner terminal, the P2P communication controller 902 controls and processes a function for establishing a P2P connection to the general terminals included in the group when the terminal operates as the group owner terminal, and also controls and processes a function for determining a next owner terminal among the general terminals included in the group, reporting to a terminal determined as the next owner terminal that it is determined as the next owner, and transmitting information on other general terminals included in the group.

Further, if the terminal is a general member, the P2P communication controller 902 controls and processes a function for operating as the next owner terminal upon receiving a signal for reporting that the terminal changes to the next owner terminal from the group owner terminal. Specifically, the P2P communication controller 902 controls and processes a function for receiving information of the general terminals included in the group from the group owner terminal and for storing the received information into the storage unit 920.

Basically, the P2P communication controller 902 controls and processes a function for performing the operations illustrated in FIG. 2 to FIG. 5.

The communication module 910 transmits and receives a signal by using a WLAN. In particular, the communication module 910 searches for neighboring P2P terminals under the control of the controller 900, and performs a function for transmitting and receiving a signal for establishing a P2P connection to the found neighboring P2P terminal.

The storage unit 920 stores data and various programs for the overall operations of the terminal, and stores information about the terminals included in the group that performs P2P communication under the control of the controller 900. As described above, the information about the terminals includes identifier information of each terminal and an intent value that indicates an intention to become a group owner.

The display unit 930 displays a variety of information, alphanumeric characters, and images generated by the operation of the terminal.

The input unit 940 includes at least one function key or a touch sensor, and thus, provides the controller 900 with data corresponding to a key pressed by a user or coordinate data corresponding to a position touched by the user.

According to the above-described embodiments of the present invention, a group owner terminal determines a next owner terminal of a group when a P2P connection is established in a WLAN, and a next owner terminal manages information about general terminals included in the group. Therefore, when the group owner terminal is disassociated, instead of performing a group owner negotiation procedure, the next owner terminal of the group becomes a group owner terminal, and thus there is an advantage in that general member terminals belonging to the group can be re-associated promptly. In addition, the above-described embodiments of the present invention also provide an advantage in that an application can be continuously used in a mobile environment where mobility is high and in that user's inconvenience is minimized.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a terminal that establishes a Peer-to-Peer (P2P) connection between terminals, the method comprising:
   operating, when the terminal is determined as a group owner terminal by terminals included in a group connected via the P2P connection, as the group owner terminal;
   determining one of the terminals included in the group to be operated as a next owner terminal; and
   transmitting information about other terminals included in the group to the next owner terminal.

2. The method of claim 1, wherein determining one of the terminals included in the group to be operated as the next owner terminal comprises:
   receiving an intent value that indicates an intention to become the group owner terminal from each of the terminals included in the group;
   comparing received intent values of the terminals included in the group; and
   determining the terminal as the next owner terminal among the terminals included in the group, based on a result of the comparing.

3. The method of claim 2, further comprising:
   detecting an association of a new terminal;
   receiving the intent value that indicates the intention to become the group owner terminal from the new terminal;
   comparing an intent value of the next owner terminal to the intent value of the new terminal; and
   determining whether to change the next owner terminal based on a result of the comparing.

4. The method of claim 1, further comprising:
   detecting an association of a new terminal; and
   transmitting information about the new terminal to the next owner terminal.

5. The method of claim 1, further comprising:
   detecting a disassociation of the next owner terminal included in the group;
   re-determining the next owner terminal among the other terminals included in the group; and
   transmitting the information about the other terminals included in the group to the re-determined next owner terminal.

6. The method of claim 1, further comprising:
   detecting a disassociation of one of the other terminals included in the group; and
   reporting the disassociation of the one of the other terminals to the next owner terminal.

7. The method of claim 1, further comprising transmitting a disassociation reporting message to the terminals included in the group, upon detection of a disassociation event of a terminal included in the group,
   wherein the disassociation reporting message includes information about the next owner terminal.

8. A method of a terminal that establishes a Peer-to-Peer (P2P) connection between terminals, the method comprising:
   determining a group owner terminal among terminals included in a group connected via the P2P connection;

receiving, from the group owner terminal, a message indicating that the terminal will operate as a next owner terminal, wherein the terminal is one of the terminals included in the group and is determined by the group owner terminal as the next owner terminal;

receiving and storing information about other terminals included in the group from the group owner terminal;

monitoring the group owner terminal; and operating, when the group owner terminal is disassociated from the P2P connection, as the next owner terminal.

9. The method of claim 8, further comprising:

detecting a disassociation of the group owner terminal, as a result of the monitoring;

changing the group owner terminal; and establishing the P2P connection to the other terminals included in the group by using the stored information about the other terminals.

10. The method of claim 8, further comprising transmitting an intent value that indicates an intention to become the group owner terminal to the group owner terminal, before receiving the message indicating that the terminal will operate as the next owner terminal.

11. An apparatus of a terminal that establishes a Peer-to-Peer (P2P) connection between terminals, the apparatus comprising:

a controller for operating, when the terminal is determined as a group owner terminal by terminals included in a group connected via the P2P connection, as the group owner terminal, and determining one of the terminals included in the group to be operated as a next owner terminal; and a communication module for transmitting information about other terminals included in the group to the next owner terminal.

12. The apparatus of claim 11, wherein the controller uses the communication module to receive an intent value that indicates an intention to become the group owner terminal from each of the terminals included in the group, to compare the received intent values of the terminals included in the group, and to determine the terminal as the next owner terminal among the terminals included in the group based on a result of the comparing.

13. The apparatus of claim 12, wherein the controller detects an association of a new terminal, receives the intent value that indicates the intention to become the group owner terminal from the new terminal, compares an intent value of the next owner terminal to the intent value of the new terminal, and determines whether to change the next owner terminal based on a result of the comparing.

14. The apparatus of claim 12, wherein the controller detects a disassociation of the next owner terminal from the group, re-determines the next owner terminal among the other terminals included in the group, and transmits the information about the other terminals included in the group to the re-determined next owner terminal.

15. The apparatus of claim 11, wherein the controller detects an association of a new terminal, and transmits information about the new terminal to the next owner terminal.

16. The apparatus of claim 11, wherein the controller detects a disassociation of one of the other terminals included in the group, and reports the disassociation of the one of the other terminals to the next owner terminal.

17. The apparatus of claim 11, wherein the controller transmits a disassociation reporting message to the terminals included in the group, upon detection of a disassociation event of a terminal, and wherein the disassociation reporting message includes information about the next owner terminal.

18. An apparatus of a terminal that establishes a Peer-to-Peer (P2P) connection between terminals, the apparatus comprising:

a controller for determining a group owner terminal among terminals included in a group connected via the P2P connection;

detecting a disassociation of the group owner terminal; and operating, when the group owner terminal is disassociated from the P2P connection, as a next owner terminal;

a communication module for receiving, from the group owner terminal, a message indicating that the terminal will operate as the next owner terminal, wherein the terminal is one of the terminals included in the group and is determined by the group owner terminal as the next terminal owner, and receiving information about other terminals included in the group from the group owner terminal; and a storage unit for storing the information.

19. The apparatus of claim 18, wherein upon detecting the disassociation of the group owner terminal, the controller changes the group owner terminal and controls the communication module to establish the P2P connection to the other terminals included in the group by using the stored information about the other terminals.

20. The apparatus of claim 18, wherein before receiving the message indicating that the terminal will operate as the next owner terminal, the controller controls the communication module to transmit an intent value that indicates an intention to become the group owner terminal to the group owner terminal.

* * * * *